INVENTOR
R. L. EILENBERGER
BY John K. Mullarney
ATTORNEY

Jan. 6, 1970 R. L. EILENBERGER 3,488,435

TIME-DIVISION MULTIPLEX SYSTEM WHEREIN A VIDICON IS USED FOR FRAME STORAGE OF VIDEO SIGNALS

Filed July 29, 1965 7 Sheets-Sheet 2

United States Patent Office 3,488,435
Patented Jan. 6, 1970

3,488,435

TIME-DIVISION MULTIPLEX SYSTEM WHEREIN A VIDICON IS USED FOR FRAME STORAGE OF VIDEO SIGNALS

Robert L. Eilenberger, Bridgewater Township, Somerset County, N.J., assignor to Bell Telephone Laboratories, Incorporated, New York, N.Y., a corporation of New York Filed July 29, 1965, Ser. No. 475,774
Int. Cl. H04n 3/00, 7/00, 3/16
U.S. Cl. 178—6.8 14 Claims

ABSTRACT OF THE DISCLOSURE

A time-division multiplex system for use with video signals is described wherein a vidicon is used at the receiving end of a transmission system to store a multiplicity of identical video images. One image is destructively read out of the vidicon almost simultaneously with the appearance of the images on the vidicon, whereas the other images are read out when pictures are being presented to other receiving circuits. As a result, efficient bandwidth utilization of a time-division multiplex system is obtained without the specific inherent disadvantages of other storage means, such as video tape and storage tubes.

This invention relates to time-division multiplexing systems and, more particularly, to time-division multiplexing systems wherein a vidicon camera tube is used for the frame storage of television signals.

Present United States broadcast television standards require the transmission of thirty complete pictures (frames) per second, each frame consisting of two line-interlaced fields, thereby giving a presentation of sixty fields per second. One of the reasons of this type of standard was adopted was to have a presentation rate which exceeds fifty fields per second, below which the interfield flicker becomes subjectively objectionable. For certain other types of video service, such as videotelephone, where fast, abrupt object motions will be either totally absent or occur infrequently, there are indications that, from the standpoint of motion presentation, as few as fifteen complete pictures or frames per second will be sufficient. In addition, since a fewer number of scanning lines than the 525 lines per frame which are used in broadcast television may be possible with videotelephone, sequential scanning rather than interlace scanning may be desirable. Accordingly, from the standpoint of motion presentation and conservation of bandwidth, the transmission of fifteen sequentially scanned frames per second would be entirely satisfactory for videotelephone. Unfortunately, direct presentation of the fifteen frames per second would be highly objectionable because of the interframe flicker.

Rather than saving bandwidth through direct transmission at fifteen frames per second, bandwidth can also be conserved for videotelephone service by transmitting only every fourth frame of a sixty frames per second video signal, storing this frame at the receiving end, and repeating it four times to the display device. In this way, an effective fifteen frames per second are transmitted, but the presentation is at a rate which will not suffer from interframe flicker. During the other three frames, the transmission link can, of course, be connected to pass other information, as for example three other videotelephone channels. The success of this method of transmission is dependent upon being able to store a frame of video information for a period of at least $\frac{1}{15}$ of a second (the time required for four $\frac{1}{60}$ of a second readouts), without noticeable change of single level as a result of repeated readouts, and with the capability of providing a full range of gray scale reproduction. Analog storage devices of this type have not been available.

One type of storage device which could conceivably meet the technical requirements is an endless loop, multiple head video tape recorder. The rapid wear of the expensive recording heads which would result under the heavy traffic conditions of videotelephone service, however, overshadows all of the otherwise technical advantages of this type of storage. Another possibility would be to utilize dual-gun storage tubes. These however, suffer from the inability to reproduce more than five steps of gray, and also from excessively long erase periods.

Accordingly, one object of the present invention is to provide a frame repeating system for videotelephone service wherein the video frame storage means is less subject to deterioration under heavy traffic conditions.

Another object of the invention is to provide a video frame storage means which is capable of providing a full range of gray scale rendition.

Still another object of the invention is to provide a video frame storage means which has a relatively short erase period.

These and other objects are attained in accordance with the present invention wherein a vidicon is used at the receiving end of a time-division multiplex system to store a multiplicity of identical video images. One image is destructively read-out of the vidicon almost simultaneously with the appearance of the images on the vidicon, whereas the other images are read-out when the transmitting link is connected to other receiving circuits. As a result, efficient bandwidth utilization of a time-division multiplex system is obtained without the above-mentioned specific inherent disadvantages of other storage means, such as video tape and storage tubes.

The objects and advantages of the invention will be more clearly understood by reference to the following detailed description when considered in connection with the accompanying drawings in which.

Figure 2:
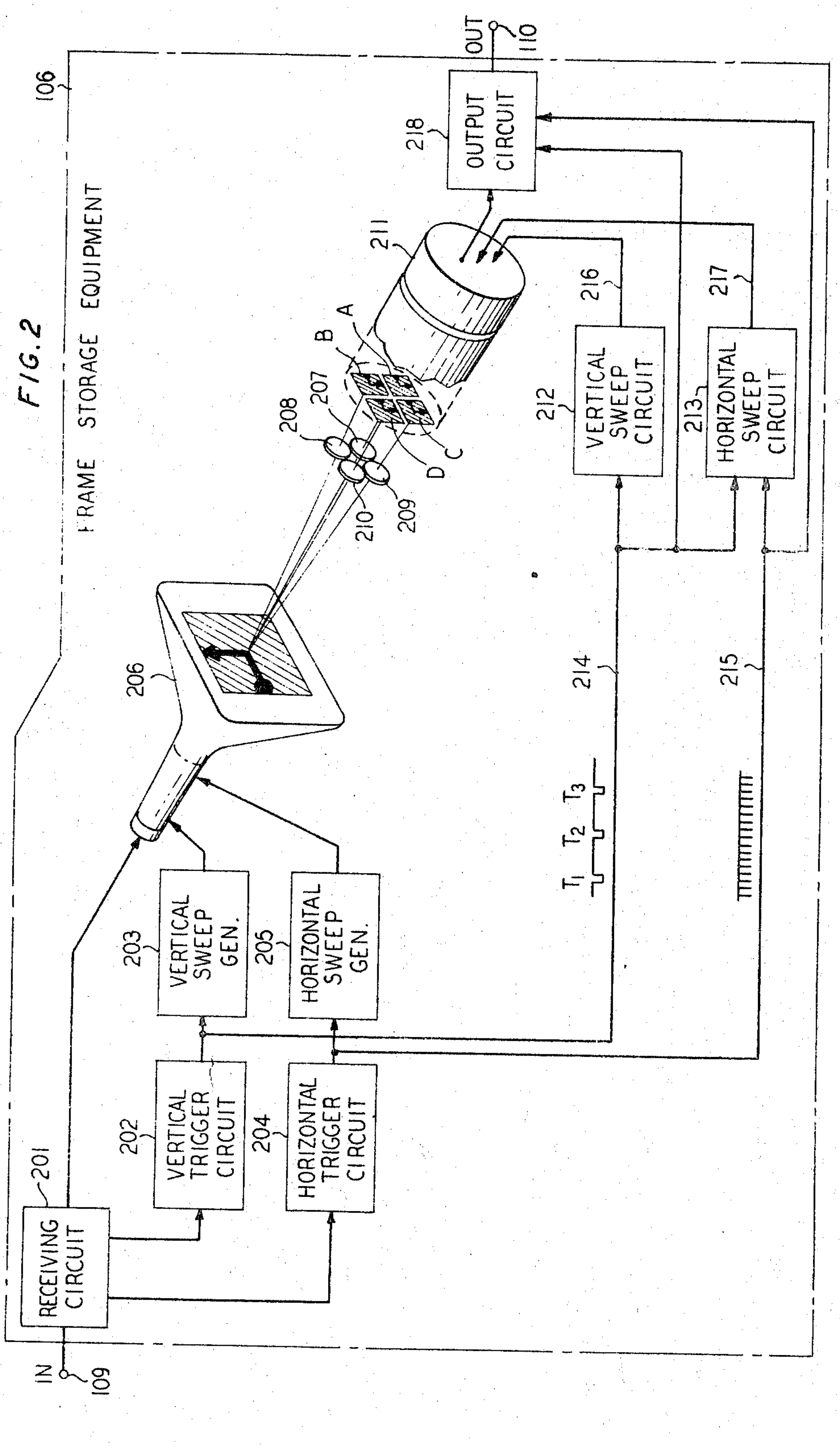
FIGS. 2 and 7 are schematic block diagrams showing two embodiments of frame storage equipment in accordance with the present invention.
Figure 5:
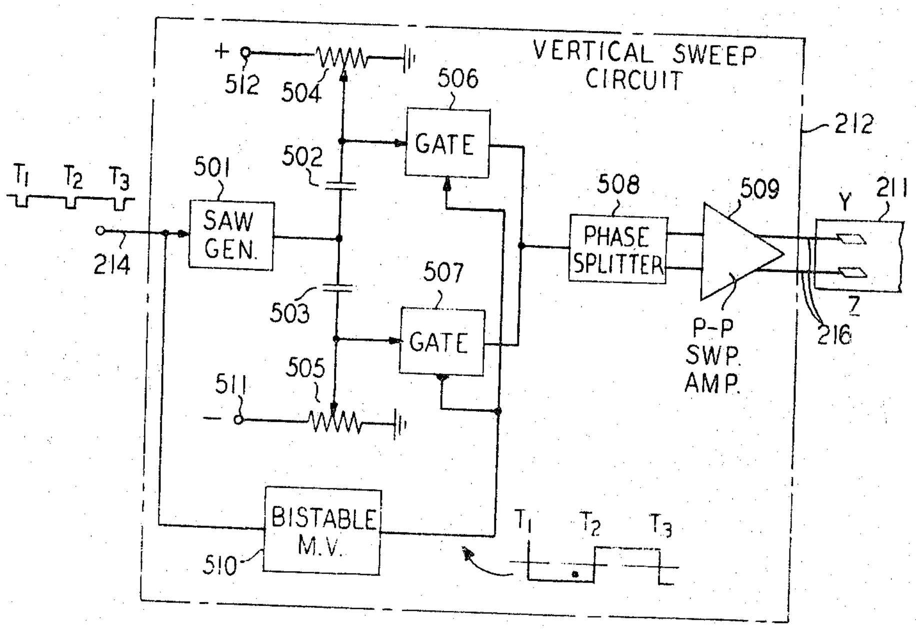
Figure 6:
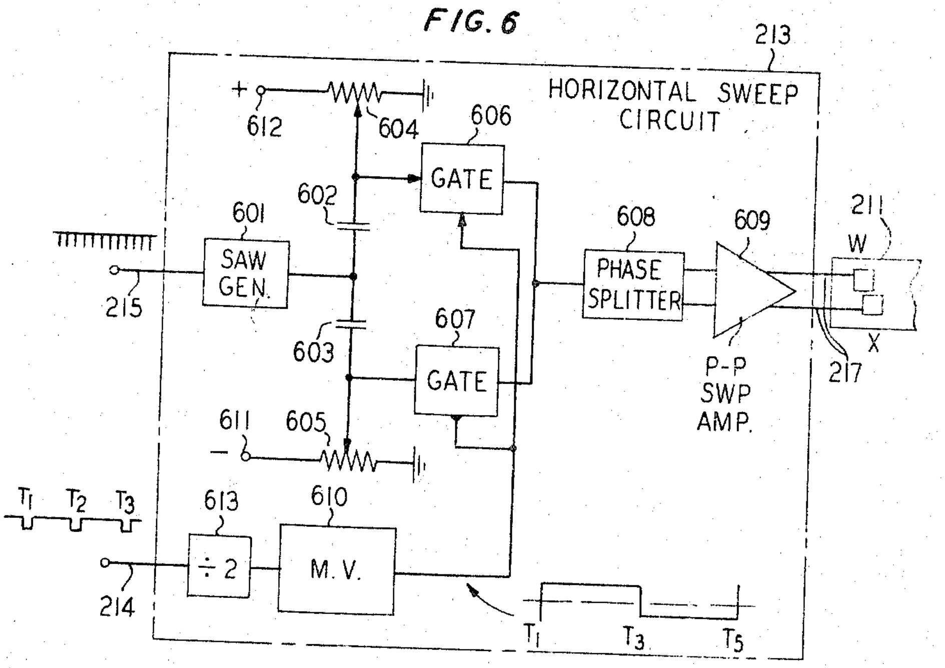
Figure 7:
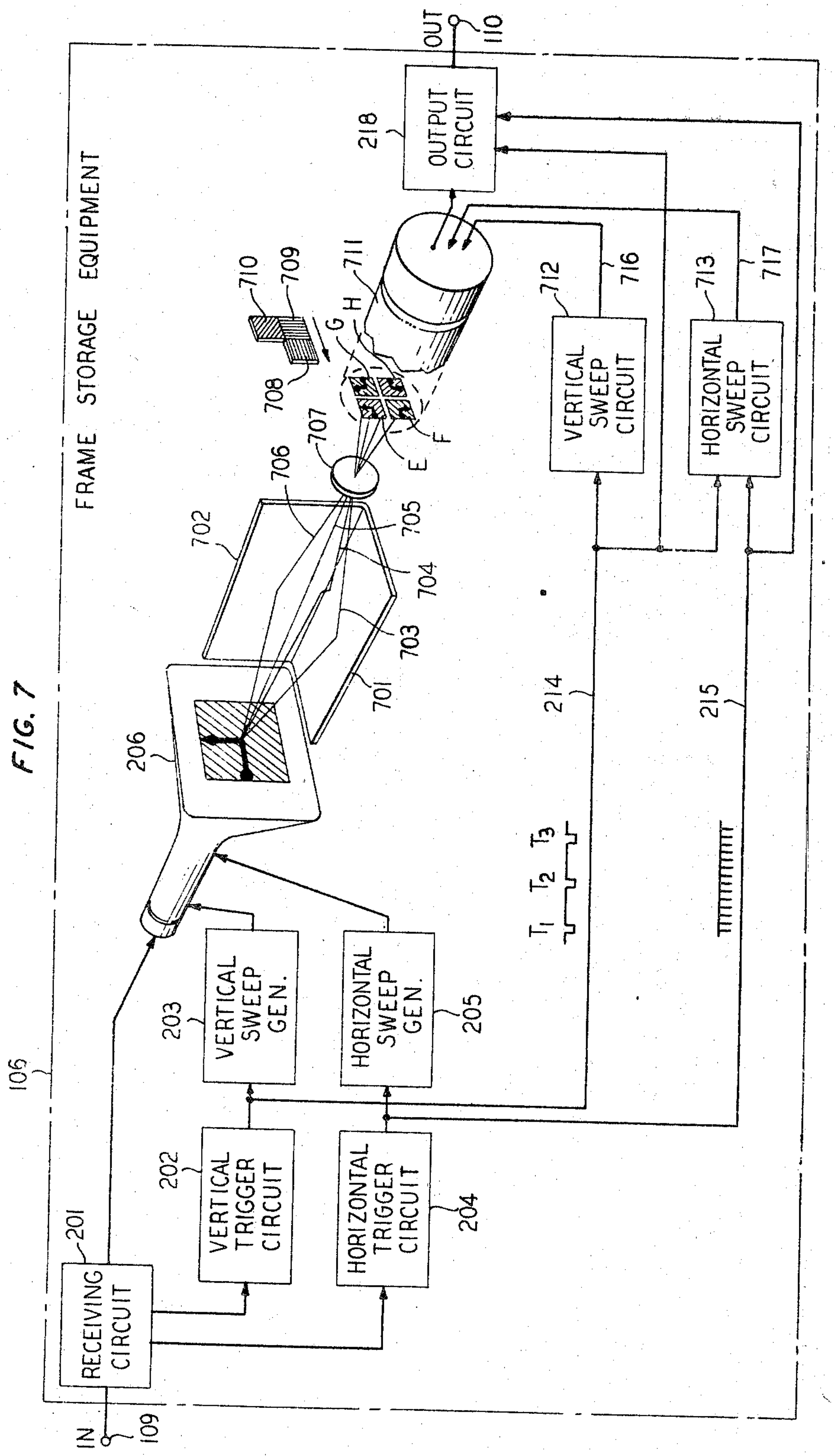

FIGS. 3, 4A, 4B, 8, 9A and 9B are pictorial drawings and voltage waveforms useful in explaining the operation of the apparatus shown in FIGS. 2 and 7; and FIGS. 5, 6, 10 and 11 are detailed schematic block diagrams of circuits shown as blocks in FIGS. 2 and 7.

Figure 1:
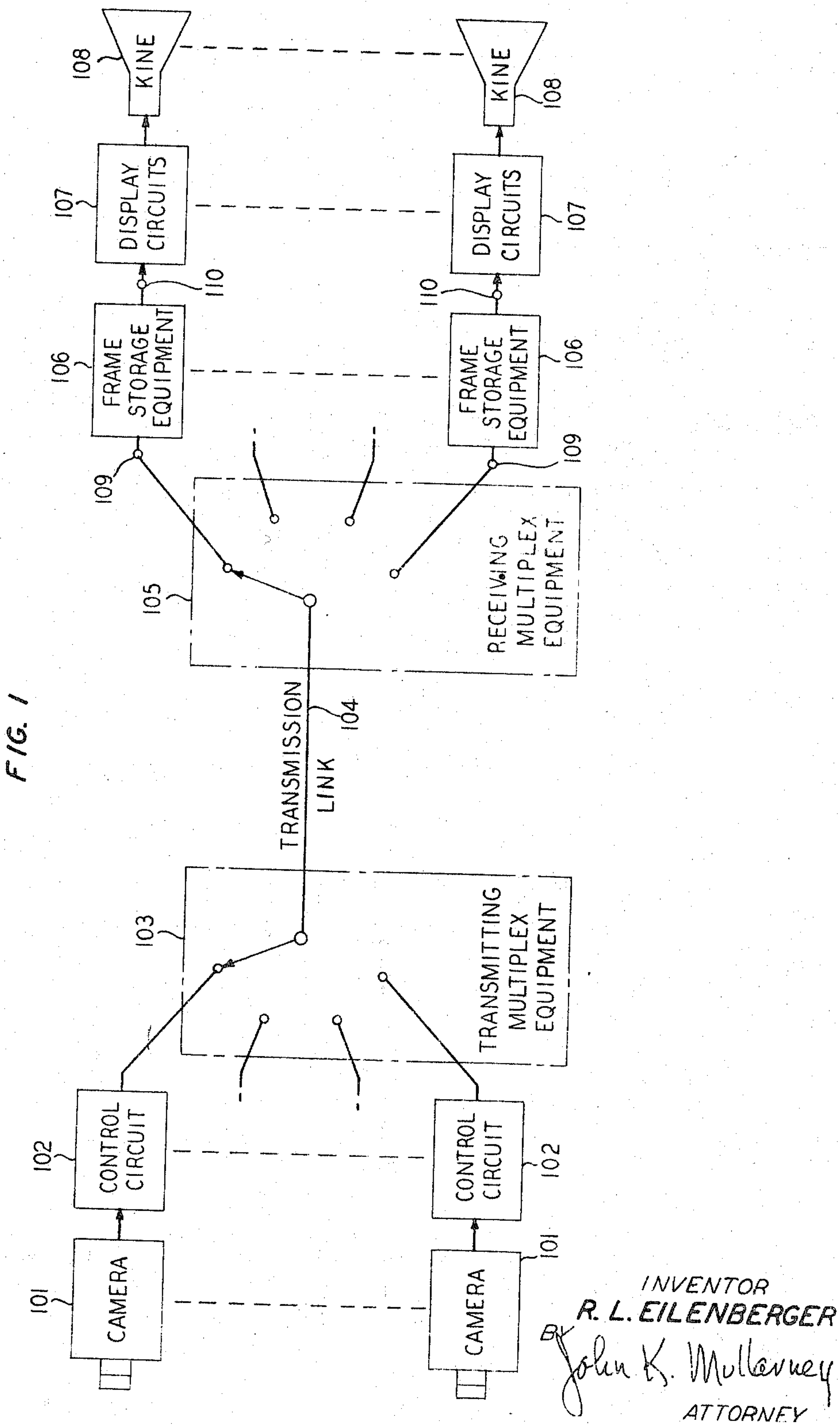
FIG. 1 is a schematic block diagram of a time-division multiplex system wherein frame storage equipment of the type constructed in accordance with the present invention may be utilized.

Referring now to FIG. 1, four television cameras 101, in association with control circuits 102, pass video signals having sixty sequentially-scanned frames per second to each one of four inputs of transmitting multiplex equipment 103. The output of transmitting multiplex equipment 103 is connected in the customary fashion via transmission link 104 to receiving multiplex equipment 105. The multiplex equipment is synchronized with the control circuits so as to connect, on a time-division basis, one out of every four frames of video signals from each control circuit through to an output of receiving multiplex equipment 105.

Connected to each output of receiving multiplex equipment 105 is a frame storage equipment 106 which receives at its input an electrical signal only during one quarter of the time when the multiplex equipment connects its input through to the transmission link 104. Frame storage equipment 106, in a manner to be described hereinafter, produces at its output a continuous electrical signal containing four successive and identical frames. The continuous electrical signal from each frame storage equipment 106 is processed and coupled by display circuits 107 to a kinescope 108 to be displayed to the viewer at a sixty frame per second rate.

FIG. 2 shows one embodiment of frame storage equipment constructed in accordance with the present invention. Receiving circuit 201 is connnected to one output terminal 109 of receiving multiplex equipment 105 (FIG. 1) to receive the single $\frac{1}{60}$ of a second frame of video out of every $\frac{1}{15}$ second interval during which time the multiplex equipment connects this particular frame storage equipment through to the multiplex link 104. From the video signal at terminal 109, receiving circuit 201 extracts and passes vertical synchronizing information to vertical trigger circuit 202, horizontal synchronizing information to horizontal trigger circuit 204, and beam intensity information to the control electrode of kinescope 206. Vertical trigger circuit 202 generates voltage impulses at a rate of sixty per second which are coupled to synchronize vertical sweep generator 203 associated with kinescope 206. Horizontal trigger circuit 204 generates voltage impulses at the proper horizontal scanning rate and these pulses are coupled to horizontal sweep generator 205 associated with kinescope 206. As a result, circuits 201 through 205, in a manner well known to those skilled in the television art cause an image to be produced on the face of kinescope 206 for each frame of video signal which is delivered by the multiplex equipment. Direct viewing of this presentation would, of course, be highly objectionable since the image on the face of kinescope 206 is present only for $\frac{1}{60}$ of a second out of each $\frac{4}{60}$ second, transmission link 104 being connected to other frame storage equipments during the balance of the time.

Figure 3:
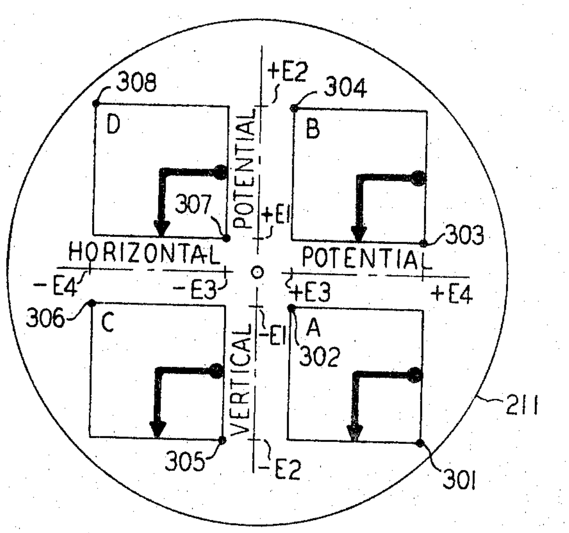

The image on the face of kinescope 206 is optically coupled by means of a four lens system, comprising convex lenses 207 through 210, to the face of vidicon 211. Lenses 207–210 are positioned in accordance with well known optical techniques so as to produce four identical image charge patterns in a substantially square array on the photo-conductive surface of vidicon 211. For the arbitrarily chosen image of an arrowhead and ball, shown on the face of kinescope 206 in FIG. 2, the charge patterns which are produced on face of vidicon 211 as seen by the electron beam of the vidicon are pictorially illustrated in FIG. 3. Also shown on FIG. 3 is a coordinate system designating the potentials which must be applied to the vidicon's vertical and horizontal deflection plates in order to displace the electron beam from its normally centered position. The charge patterns which are produced by lenses 207, 208, 209 and 210 have been arbitrarily designated in FIG. 3 as images A, B, C and D, respectively.

Referring again to FIG. 2, vertical sweep circuit 212 and horizontal sweep circuit 213, in response to the triggering impulses on lines 214 and 215, produce vertical and horizontal sweep voltages on lines 216 and 217, respectively, for the vertical and horizontal deflection plates of vidicon 211. These sweep voltages provided by circuits 212 and 213 are of the proper waveform so as to cause the vidicon to sequentially scan and read out each of the four charge patterns. One charge pattern, for example, pattern A of FIG. 3, is read out substantially simultaneously with, and at the same rate as, the appearance of the image on kinescope 206. In the following $\frac{3}{60}$ second interval during which transmission link 104 is connected to other frame storage equipments, identical image charge patterns will still exist at B, C, and D, all of which are scanned and destructively read out in sequence to provide at the output of the vidicon 211 a continuous electrical signal having a motion-equivalence of a fifteen frame per second picture but displayed at a sixty frame per second rate. Output circuit 218 combines the vidicon output signal with vertical and horizontal synchronizing information from lines 214 and 215 and passes the resulting video signal to display circuits 107 of FIG. 1.

Figure 4A:
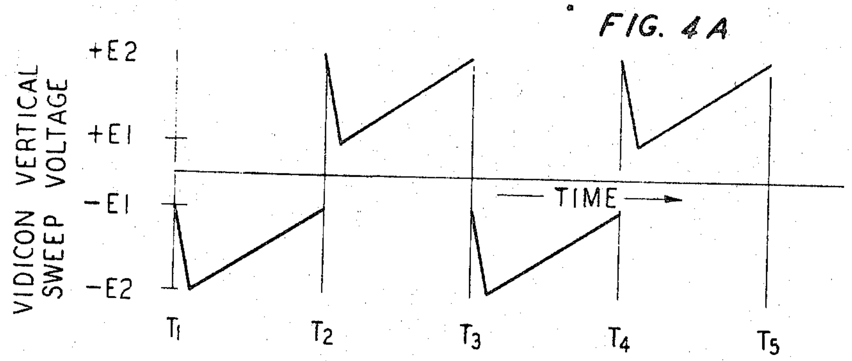
Figure 4B:
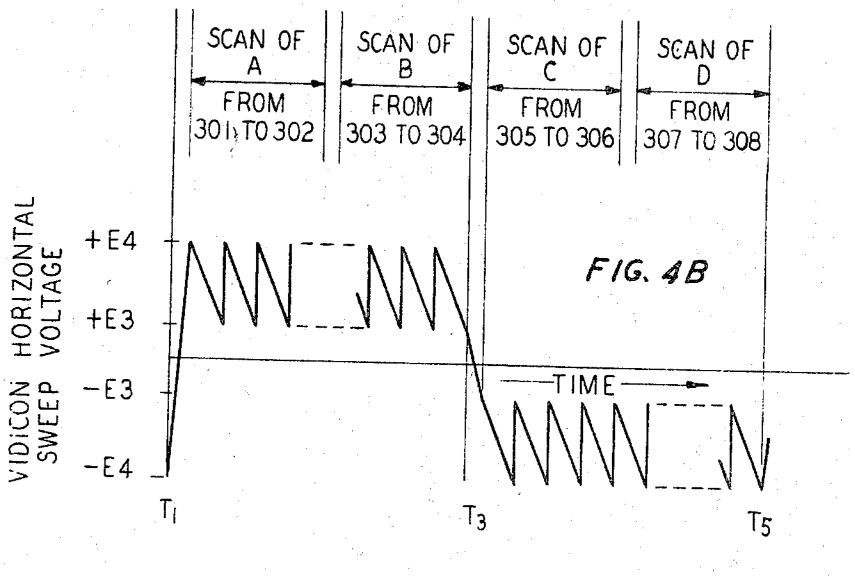

The image presented on kinescope 206 will, of course, appear simultaneously at all four positions A, B, C and D on the vidicon 211 and therefore any one of the vidicon charge patterns may be read out first with the other three read out in the $\frac{3}{60}$ of a second interval during which kinescope 206 is disconnected from the transmission link 104. Assuming a sequential readout of A–B–C–D, the vertical and horizontal sweeping potentials which must be applied to a vidicon utilizing electrostatic deflection are shown in FIGS. 4A and 4B, respectively. Assuming that kinescope 206 is scanned in the normal fashion, i.e., from top to bottom and from left to right as viewed from the front of the kinescope, each charge pattern on the vidicon face must be scanned from bottom to top and from right to left as viewed by the electron scanning beam of the vidicon. This reversal in the scanning directions is required as a result of the well-known inversion which takes place in the production of a real image by a converging lens, in this case by lenses 207 through 210. Accordingly, whereas the arrowhead in the image on kinescope 206 in FIG. 2 is at the top and the ball is to the left, the arrowhead is at the bottom of each charge pattern on vidicon 211 in FIG. 3 and the ball is at the right.

Plots of the voltage waveforms which are produced by vertical sweep circuit 212 on line 216 and horizontal sweep circuit 213 on line 217 are shown in FIGS. 4A and 4B, respectively. The ordinates of these graphs, representing the potentials which are applied between the deflection plates of vidicon 211, are designated in terms of the potentials shown in the coordinate system of FIG. 3, and the abscissas representing time, are marked off in units corresponding to the outputs of vertical trigger circuit 202. Careful examination of the waveforms in FIGS. 4A and 4B in connection with the image charge patterns of FIG. 3 reveals that charge pattern A is scanned from bottom to top and right to left in the time interval between $T_1$ and $T_2$, B is scanned in the same way between $T_2$ and $T_3$, C between $T_3$ and $T_4$, and D between $T_4$ and $T_5$. The number of horizontal scans indicated for a given interval in FIG. 4B is purely arbitrary and has been chosen to be few enough to show the slope of the lines, thereby indicating the direction of scanning.

Referring now to FIG. 5, a detailed schematic block diagram of vertical sweep circuit 212 is shown which is utilized to produce the vidicon vertical sweep voltage shown in FIG. 4A. The voltage impulses on line 214 of FIG. 2 sychronize sawtooth generator 501 which produces a sawtooth voltage waveform having a period of $\frac{1}{60}$ of a second. The output of generator 501 is coupled to the input of gate 506 by capacitor 502 and to the input of gate 507 by capacitor 503. The sawtooth voltage waveform at the input of gate 506 is biased in a positive direction by the potential on the arm of potentiometer 504, which potential is produced by the current flow from positive potential source 512 through potentiometer 504 to reference potential. The sawtooth voltage waveform at the input of gate 507 is similarly biased in a negative direction by the potential on the arm of potentiometer 505, the latter potential being produced by the current which flows from reference potential through potentiometer 505 to negative potential source 511.

The voltage impulses on line 214 also trigger bistable multivibrator 510 which provides a square wave voltage wavform having a period of $\frac{1}{30}$ of a second at the control terminals of gates 506 and 507. Gates 506 and 507 can be of the type shown in Patent 2,899,571 of Aug. 11, 1959 to P. B. Myers, but should differ from each other in that one gate will operate, i.e., connect its input through to its output, in response to a positive potential on its control termnal whereas the other gate will operate in response to a negative potential on its control electrode. In the gate shown in the above-mentioned Myers patent, this opposite type of operation can be achieved by simply changing the conductivity type of the transistors and the poling of the diode. Hence only one of gates 506 and 507 will be in operation at any given time and multivibrator 510 will cause gates 506 and 507 to alternately feed through a positively biased sawtooth and a negatively biased sawtooth to the input of phase splitter 508. Accordingly, the waveshape at the input to phase splitter 508 is the same as that shown in FIG. 4A where the positive-going voltage between $T_1$ and $T_2$ and between $T_3$ and $T_4$ is positively biased at point midway between $E_2$ and $E_1$, and the positive-going voltage between $T_2$ and $T_3$ and between $T_4$ and $T_5$ is negatively biased at a point midway between $-E_2$ and $-E_1$. Phase splitter 508 and push-pull sweep amplifier 509 simply serve to develop a potential for each of the vertical deflection plates of vidicon 211 which is equidistant from reference potential, thereby avoiding operation of one of the plate at reference potential and the well-known problems attendant therewith.

Referring now to FIG. 6, a detailed schematic block diagram of horizontal sweep circuit 213 is shown which is utilized to produce the vidicon horizontal sweep potential shown in FIG. 4B. The voltage impulses on line 215 of FIG. 2 synchronize sawtooth generator 601 which produces a sawtooth voltage waveform having the desired horizontal scanning frequency. The output of generator 601 is coupled to the input of gate 606 by capacitor 602 and to the input of gate 607 by capacitor 603. The sawtooth voltage waveform at the input of gate 606 is biased in a positive direction by potentiometer 604 and positive potential source 612, and the sawtooth voltage waveform at the input of gate 607 is biased in a negative direction by potentiometer 605 and negative potential source 611.

The voltage impulses on line 214 are utilized by frequency divider 613 and multivibrator 610 to provide a square wave voltage waveform having a period of 1/15 of a second at the control terminals of gates 606 and 607. The latter gates can also be of the type shown in the Myers patent and here again, as with gates 506 and 507, each should operate in response to a voltage of opposite polarity from that required for the other. Hence, only one of gates 606 and 607 will be in operation at any given time, and multivibrator 610 will cause gates 606 and 607 to alternately feed through positively biased sawtooth waveforms and negatively biased sawtooth waveforms to the input of phase splitter 608 with a change in the polarity occurring every 1/30 of a second. Accordingly, the waveshape at the input to phase splitter 608 is the same as that shown in FIG. 4B where the horizontal scanning sawtooth voltage waveform between $T_1$ and $T_3$ is negatively biased at a point midway between $-E_3$ and $-E_4$ and between $T_3$ and $T_5$ is positively biased at a point midway between $+E_3$ and $+E_4$. Phase splitter 608 and push-pull sweep amplifier 609 serve the usual function of developing an opposite potential equidistant from reference potential for each of the horizontal deflection plates of vidicon 211.

Some vidicons have a sensitivity which is a function of the radial displacement from the center of the vidicon face. If such a vidicon is used in the frame storage equipment shown in FIG. 2, a fifteen cycle per second flicker might result since each element of the image on kinescope 206 does not appear on the face of vidicon 211 at the same radial distance from center in each charge pattern. To eliminate the fifteen cycle per second flicker encountered with such a vidicon, a compensating filter in the form of a circular density wedge can be placed over the vidicon faceplate, with the radial density wedge can be placed over the vidicon faceplate, with the radial density appropriately graded to provide the desired correction.

An alternate method for placing four simultaneous charge patterns on the face of a vidicon in which each element of the image is at the same radial distance from the center of the vidicon face in all four charge patterns is shown in the schematic block diagram of the frame storage equipment in FIG. 7. Circuit elements 201 through 205 operate in exactly the same way as described hereinabove in connection with FIG. 2 to produce an image on the face of kinescope 206 and vertical and horizontal voltage impulses on lines 214 and 215, respectively. Two plane mirrors, designated as 701 and 702, placed at right angles to each other and to the plane of the face of kinescope 206, optically cooperate with lens 707 in the same manner as is found in a kaleidoscope to form four charge patterns on the face of vidicon 711. For the connected arrowhead and ball image shown on the face of kinescope 206 in FIG. 7, the four charge patterns which are formed on face of vidicon 711 as seen by the electron scanning beam of the vidicon are pictorially illustrated in FIG. 8 and designated as charged patterns E, F, G and H.

The optical paths followed by the image from kinescope 206 before preceding through lens 707 are indicated in FIG. 7 as rays 703, 704, 705 and 706. The image is reflected from mirror 701 as shown by ray 703 to form an inverted image which proceeds through lens 707 to form charge pattern G. The image is also reflected from mirror 702 as shown by ray 706 to form a reverted image which proceeds through lens 707 to form charge pattern F. In addition, the image passes directly from kinescope 206 through lens 707 as shown by ray 705 to form charge pattern H. And finally, the image is first reflected from mirror 702 and then reflected from mirror 701 to form a reverted-inverted image which proceeds through lens 707 to form charge pattern E. As can easily be seen from the FIG. 8 pictorial illustrations of the charge patterns, the charge patterns developed have a symmetry with respect to the center of vidicon 711 such that each element of the image is at the same radial distance in each of the four charge patterns. As a result, no flicker will be introduced by the fact that the vidicon which is used has a sensitivity which is a function of the radial displacement from the center of the vidicon face.

Unfortunately, the mirrors which are presently available are enough less than 100 percent efficient in reflecting light from their surfaces, so that a fifteen cycle per second flicker is introduced by virtue of the fact that the light rays which are reflected from the surfaces of mirrors 701 and 702 have less energy than light ray 705 which is transmitted directly, without reflection, to the face of vidicon 711. To compensate for these small differential losses due to reflection, small neutral density square filters 708, 709, and 710 are placed on the faceplate of vidicon 711. The area of the vidicon face on which inverted, reverted ray 704 forms a charge pattern can be left clear, i.e., without a filter, since this ray encounters the greatest loss due to the double reflection. Filter 709 should, of course, introduce the greatest loss since the direct ray 705 passes through this filter.

Figure 8:
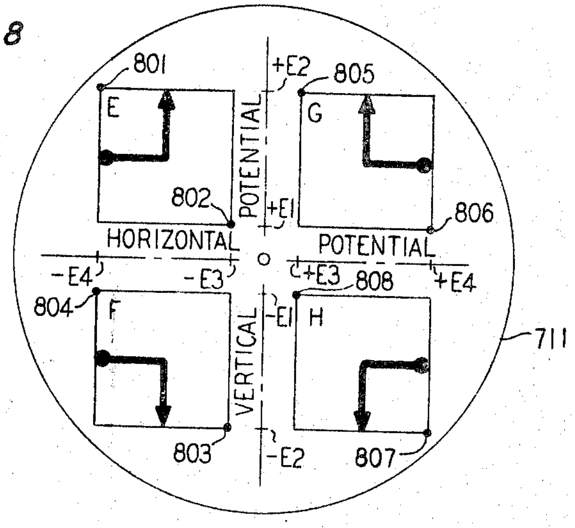

Charge patterns E, F, G and H produced on the face of vidicon 711 by the inversion-reversion, lens-mirror system shown in FIG. 7, are pictorially illustrated in FIG. 8. Also shown in FIG. 8 is a coordinate system giving the vertical and horizontal sweep potentials which must be applied to the deflection plates of the vidicon in order to deflect the electron scanning beam. Assuming again, as in connection with FIG. 2, that kinescope 206 in FIG. 7 has been scanned in the conventional sense, i.e., from top to bottom and from left to right as viewed from the front of the kinescope, the vertical and horizontal vidicon sweep voltages which are utilized to successively sweep the charge patterns E, F, G and H are plotted in FIGS. 9A and 9B, respectively.

Figure 9A:
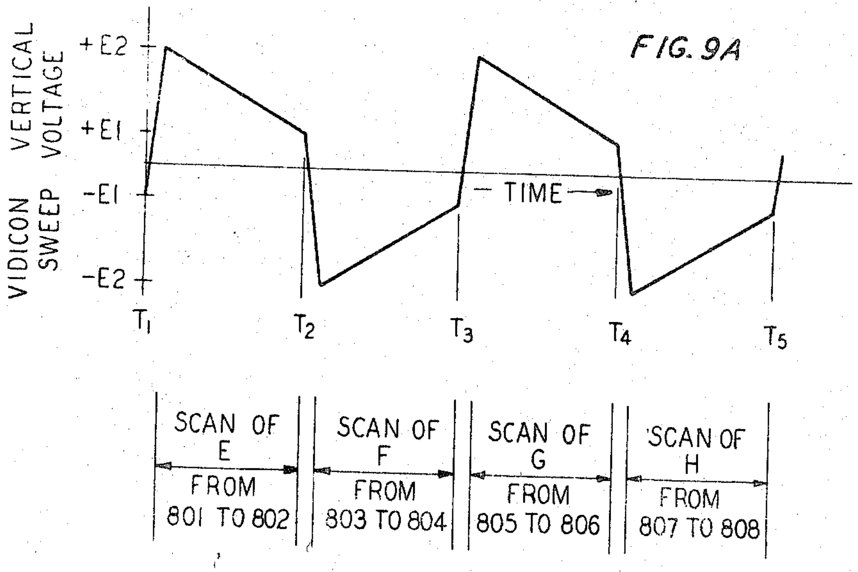
Figure 9B:
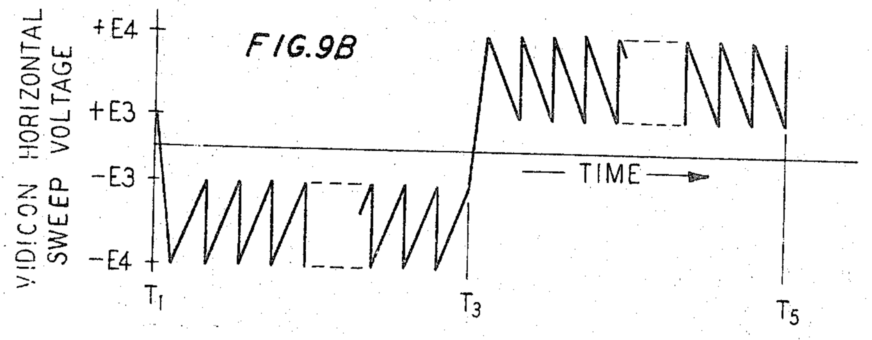

Examination of the waveforms plotted in FIGS. 9A and 9B along with the potentials on the coordinates of FIG. 8 reveals that charge pattern E is scanned in the interval between $T_1$ and $T_2$, charge pattern F in the interval between $T_2$ and $T_3$, charge pattern G between $T_3$ and $T_4$, and charge pattern H between $T_4$ and $T_5$. Vertical sweep circuit 712 of FIG. 7 and horizontal sweep circuit 713 are designed to provide the sweep voltages plotted in FIGS. 9A and 9B, respectively, to the vertical and horizontal deflection plates of vidicon 711. As a result, vidicon 711 provides a continuous video signal to output circuit 218 which, in turn, combines this signal with vertical and horizontal synchronizing information from lines 214 and 215. respectively, to provide a usable continuous video signal to display circuits 107 of FIG. 1.

Figure 10:
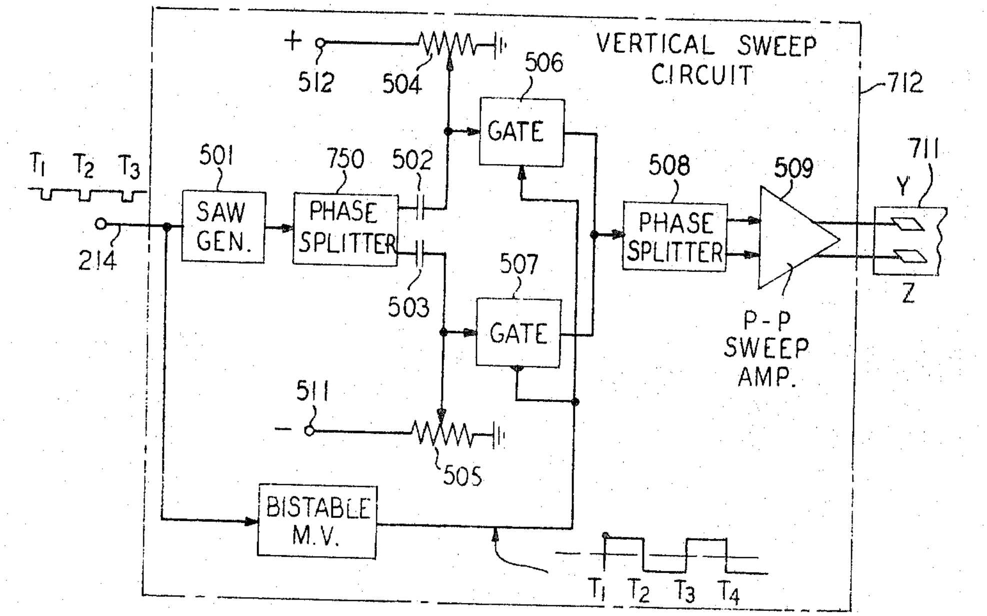

Comparison of the sweep voltage waveforms of FIGS. 9A and 9B with those of FIGS. 4A and 4B reveals that the polarity alternates in the same sequence and during the same intervals in both sets of sweep voltages but the slope of the FIGS. 9A and 9B sweep voltages changes with every change in polarity whereas the slope of the FIGS. 4A and 4B sweep voltages remains the same. Referring now to FIG. 10, a detailed schematic block diagram of vertical sweep circuit 712 is shown. The change in slope of the sweep voltage with changes in polarity is achieved in a circut very much like the circuit of FIG. 5 by inserting phase splitter 750 at the output of sawtooth generator 501 and by connecting coupling capacitors 502 and 503 to the separate outputs of phase splitter 750, each of which outputs provides a voltage whose polarity is changing in the opposite direction from that of the other. The other elements and circuits of FIG. 10 operate in exactly the same way as their correspondingly numbered elements described hereintofore in connection with FIG. 5. Phase splitter 750 simply serves to provide gate 506 in FIG. 10 with a sweep voltage having a slope opposite to the sweep voltage which is provided to gate 507. As a result, the slope of the sweep voltage changes with each change in polarity, and a vertical sweep voltage having the waveform shown in FIG. 9A is provided to the vertical deflection plates of vidicon 711.

Figure 11:
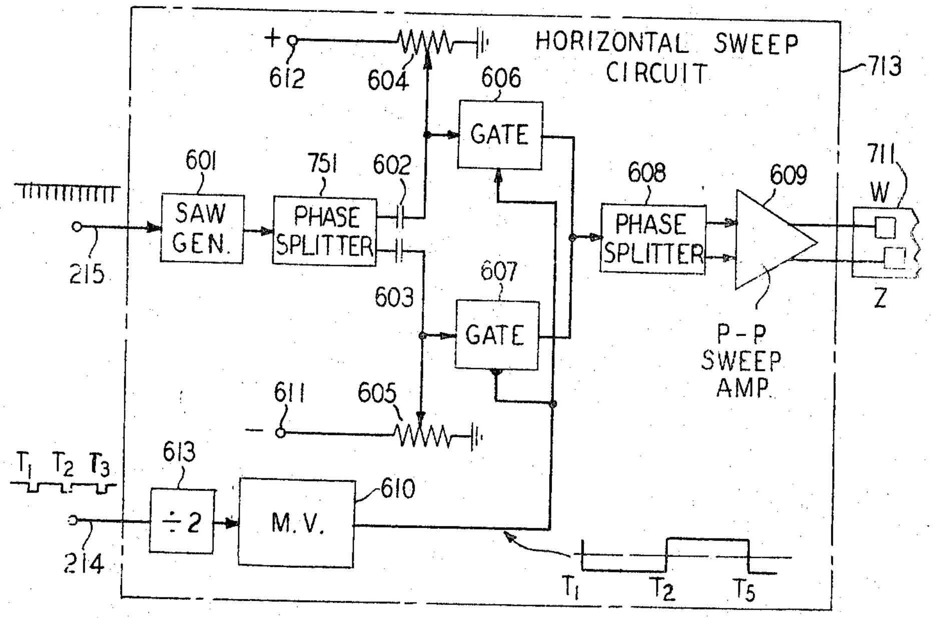

Referring now to FIG. 11, a detailed schematic block diagram of horizontal sweep circuit 713 is shown. The change in slope of sweep voltage with change in polarity is achieved in a circuit very much like the circuit of FIG. 6 by inserting phase splitter 751 at the output of sawtooth generator 601 and by connecting coupling capacitors 602 and 603 each to an output of phase splitter 751. Gate 606 is thereby provided with a sweep voltage having a slope opposite to the slope of the sweep voltage provided to gate 607. The other elements and circuits of FIG. 11 operate in exactly the same way as their corresponding numbered elements described hereintofore in connection with FIG. 6. As a result, the slope of the horizontal sweep voltage changes with each change in polarity, and a horizontal sweep voltage having the waveform shown in FIG. 9B is provided to the horizontal deflection plates of vidicon 711.

What has been described hereintofore is a specific illustrative embodiment of the principles of the present invention. It is to be understood that numerous other arrangements of physical parts and different component parts may be utilized with equal advantage. For example, the sequence in which the charge patterns on the face of the vidicon is scanned is in no way critical; changes in this sequence can be made by providing the proper voltage waveforms from the vertical and horizontal sweep circuits. As will be obvious to those skilled in the art, the voltage waveforms shown and others can be provided with a wide variety of circuits.

Accordingly, it is to be understood that the above-described arrangement is only illustrative of the application of the principles of the present invention and numerous modifications may be devised by those skilled in the art without departing from the spirit and scope of the invention.

What is claimed is:

1. In a time-division multiplex system for the transmission of video signals wherein a plurality of receiving stations are sequentially connected to a plurality of transmitting stations over a common transmission medium to provide a signal at each receiving station consisting of video frames separated by time gaps during which the system is connected to the other receiving stations, each receiving station comprising a kinescope, means connecting the received signal to said kinescope for forming an image of each received video frame, a vidicon, optical means for producing multiple substantially identical charge patterns of said image in said vidicon, means for sequentially scanning the charge patterns on said vidicon thereby producing a continuous electrical signal at the output of said vidicon, and kinescope display means coupled to receive said output.

2. A time-division multiplex system as defined in claim 1 wherein said optical means includes a plurality of convex lenses each one of which focuses said image on said vidicon to form one of the multiple charge patterns.

3. A time-division multiplex system as defined in claim 1 wherein said optical means includes at least two plane mirrors at right angles to each other and to the plane of the face of the said kinescope and a single lens between said mirrors and said vidicon, said mirrors producing an inverted, reverted, and inverted-reverted image of the image on said kinescope all of which images including the image on said kinescope are focused by said lens on said vidicon.

4. A time-division multiplex system as defined in claim 3 wherein said optical means further includes at least one neutral density filter in each of the paths of the inverted, reverted, and inverted-reverted images produced by said mirrors.

5. In a time-division multiplex system wherein only one out of a plurality of frames of video signal is transmitted to the receiving end of the system, means for storing and repeating each received frame a plurality of times so as to produce a continuous video signal comprising a kinescope, means for displaying the received frame on said kinescope to form a kinescope image, a vidicon, means optically couping said kinescope image to said vidicon for forming a plurality of substantially identical charge patterns on said vidicon of said kinescope image, and means connected to said vidicon for sequentially scanning said plurality of charge patterns.

6. In a time-division multiplex system as defined in claim 5 wherein said means for forming a plurality of substantially identical charge patterns includes a plurality of convex lenses.

7. In a time-division multiplex system as defined in claim 5 wherein the number of substantially identical charge patterns equals four.

8. In a time-division multiple system as defined in claim 7 wherein said means for forming four substantially identical charge patterns includes at least two plane mirrors at right angles to each other and to the plane of said kinescope image and a single lens between said mirrors and said vidicon.

9. In a time-division multiplex system as defined in claim 8 wherein said means for forming four substantially identical charge patterns further includes a neutral density filter in the optical paths which form at least three of the four substantially identical charge patterns.

10. In a time-division multiplex system wherein a plurality of receiving stations are sequentially connected to a plurality of transmitting stations over a common transmission medium such that the signal at the input of each receiving station has connected intervals interposed with time gaps during which the system is connected to other receiving stations, means included within each receiving station for forming a continuous signal comprising means for visually displaying the signal received during each connected interval, a camera tube having a photoconductive surface, optical means for forming a plurality of substantially identical charge patterns on said photoconductive surface of said visually displayed signal, and means connected to said camera tube for sequentially scanning the plurality of substantially identical charge patterns.

11. In a time-division multiplex system as defined in claim 10 wherein said optical means includes a plurality of convex lenses.

12. In a time-division multiplex system as defined in claim 10 wherein the number of substantially identical charge patterns equals four.

13. In a time-division multiplex system as defined in claim 12 wherein said optical means includes at least two plane mirrors perpendicular to each other and a single lens between said mirrors and said photoconductive surface.

14. In a time-division multiplex system as defined in claim 13 wherein said optical means further includes at least three neutral density filters between said single lens and said photoconductive surface.

References Cited

UNITED STATES PATENTS

| | | | |
|---|---|---|---|
| 2,294,820 | 9/1942 | Wilson | 178—5.2 |
| 2,552,464 | 5/1951 | Siezen | 178—5.2 |
| 2,603,706 | 7/1952 | Sleeper | 178—5.2 |
| 2,459,131 | 1/1949 | Mesner | 328—123 |
| 2,878,310 | 3/1959 | Becker | 178—6 |
| 3,153,699 | 10/1964 | Plass | 178—6.8 |
| 3,324,346 | 6/1967 | Stone | 340—324.1 |

ROBERT L. GRIFFIN, Primary Examiner

JOSEPH A. ORSINO, Jr., Assistant Examiner

U.S. Cl. X.R.

178—5.6, 7.5; 179—15; 328—124, 126